United States Patent
Lee et al.

(10) Patent No.: US 8,153,208 B2
(45) Date of Patent: Apr. 10, 2012

(54) LIQUID CRYSTAL DISPLAY, A METHOD FOR MANUFACTURING A LIQUID CRYSTAL DISPLAY AND A LIQUID CRYSTAL COMPOSITION

(75) Inventors: Jun-Hyup Lee, Seoul (KR); Jae-Jin Lyu, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 337 days.

(21) Appl. No.: 12/560,606

(22) Filed: Sep. 16, 2009

(65) Prior Publication Data
US 2010/0283951 A1    Nov. 11, 2010

(30) Foreign Application Priority Data
May 7, 2009    (KR) .................. 10-2009-0039936

(51) Int. Cl.
*C09K 19/52* (2006.01)
*C09K 19/20* (2006.01)
*C09K 19/12* (2006.01)
*G02F 1/133* (2006.01)
*G02F 1/1343* (2006.01)

(52) U.S. Cl. ............... 428/1.1; 252/299.01; 252/299.66; 252/299.67; 349/139; 349/185

(58) Field of Classification Search ............ 252/299.01, 252/299.66, 299.67; 428/1.1; 349/139, 185
See application file for complete search history.

(56) References Cited

U.S. PATENT DOCUMENTS

| | | | |
|---|---|---|---|
| 6,686,017 B2* | 2/2004 | Ogawa | 428/64.1 |
| 7,807,068 B2* | 10/2010 | Bremer et al. | 252/299.01 |
| 2009/0141215 A1* | 6/2009 | Bremer et al. | 349/86 |
| 2010/0304015 A1* | 12/2010 | Kim et al. | 427/67 |

* cited by examiner

*Primary Examiner* — Shean Wu
(74) *Attorney, Agent, or Firm* — F. Chau & Associates, LLC (57) ABSTRACT

A liquid crystal display includes: a first substrate, a second substrate facing the first substrate, a field generating electrode disposed on at least one of the first substrate and the second substrate and a liquid crystal layer interposed between the first substrate and the second substrate. The liquid crystal layer includes liquid crystal molecules and an alignment polymer. The alignment polymer is formed by light-irradiating the liquid crystal molecules and an alignment aid. The alignment aid includes a mesogen having halogen atoms and at least one photo-polymerizable group combined to the mesogen, and the alignment aid is electrically neutral or quasi-neutral.

25 Claims, 7 Drawing Sheets

LIQUID CRYSTAL DISPLAY, A METHOD FOR MANUFACTURING A LIQUID CRYSTAL DISPLAY AND A LIQUID CRYSTAL COMPOSITION

CROSS-REFERENCE TO RELATED APPLICATION

This application claims priority to Korean Patent Application No. 10-2009-0039936 filed on May 7, 2009, the entire disclosure of which is hereby incorporated by reference herein in its entirety.

BACKGROUND OF THE INVENTION (a) Technical Field

The present disclosure relates to a liquid crystal display, a method for manufacturing a liquid crystal display and to a liquid crystal composition.

(b) Description of the Related Art

Liquid crystal displays are a widely used type of flat panel display. A liquid crystal display typically includes two display panels on which field generating electrodes are formed, and a liquid crystal layer interposed between the panels. In the liquid crystal display, voltages may be applied to the field generating electrodes so as to generate an electric field over the liquid crystal layer, and the alignment of liquid crystal molecules of the liquid crystal layer may be determined by the electric field. Accordingly, the polarization of incident light may be controlled, thereby performing image display.

In addition, liquid crystal displays should be provided with a liquid crystal material that is suitable to control the transmittance of light and obtain desired images. For example, according to the various usages of the liquid crystal display, various characteristics such as low voltage driving, a high voltage holding ratio (VHR), a wide viewing angle characteristic, a wide operation temperature range, and a high speed response may be required.

The liquid crystal layer may include a liquid crystal composition of various kinds of liquid crystal molecules mixed together to satisfy the various characteristics.

On the other hand, it is further noted that the initial alignment of the liquid crystal molecules may be significant.

To obtain an acceptable initial alignment of the liquid crystal molecules, pre-tilt thereof should be uniformly controlled. When the pre-tilt of the liquid crystal molecules is non-uniform, the initial alignment of the liquid crystal molecules may be somewhat random such that it may be difficult to control light passing through the liquid crystal layer. In this case, the contrast ratio may be decreased, and the pre-tilt non-uniformity may be shown as a afterimage such that the display characteristics may be deteriorated.

The above information disclosed in the Background section is only for enhancement of the understanding of the background of the invention and therefore it may contain information that does not form prior art that is already known to a person of ordinary skill in the art.

SUMMARY OF THE INVENTION

Exemplary embodiments of the present invention may reduce afterimages of a liquid crystal display that are generated due to differences in pre-tilt of liquid crystal molecules, and improve the display characteristics thereof.

In accordance with an exemplary embodiment of the present invention, a liquid crystal display is provided. The liquid crystal display includes: a first substrate, a second substrate facing the first substrate, a field generating electrode disposed on at least one of the first substrate and the second substrate and a liquid crystal layer interposed between the first substrate and the second substrate. The liquid crystal layer includes liquid crystal molecules and an alignment polymer. The alignment polymer is formed by light-irradiating the liquid crystal molecules and an alignment aid. The alignment aid includes a mesogen having halogen atoms and at least one photo-polymerizable group combined to the mesogen, and the alignment aid is electrically neutral or quasi-neutral.

The halogen atoms may be connected to an aromatic cyclic between the photo-polymerizable groups, and the halogen atoms may be disposed to be structurally symmetrical.

The mesogen may be one of naphthalene, biphenyl, and bisphenol A combined with the halogen atoms.

The halogen atoms may include one selected from fluorine, chlorine, bromine, and iodine.

The photo-polymerizable group may include at least one selected from an acryl group and a methacryl group.

The alignment aid may include at least one selected from compounds represented by Formulae 1 to 8.

[Formula 1]

[Formula 2]

[Formula 3]

[Formula 4]

[Formula 5]

-continued

[Formula 6]

[Formula 7]

[Formula 8]

The alignment aid may be included with in amount of about 0.1 wt % to about 0.5 wt % based on the amount of the liquid crystal molecules.

The field generating electrode may have a plurality of micro-slits.

The first substrate may be a thin film transistor array panel and the second substrate may be a common electrode panel, and at least one of a color filter and a black matrix may be disposed on the thin film transistor array panel.

In accordance with an exemplary embodiment of the present invention, a manufacturing method of a liquid crystal display is provided. The method includes: forming a first display panel including a pixel electrode, forming a second display panel including a common electrode, assembling the first display panel and the second display panel, forming a liquid crystal layer including liquid crystal molecules and an alignment aid between the first display panel and the second display panel, applying a voltage between the pixel electrode and the common electrode and light-irradiating the liquid crystal layer in a state in which the voltage is applied between the pixel electrode and the common electrode to polymerize the alignment aid. The alignment aid includes a mesogen having halogen atoms and at least one photo-polymerizable group combined to the mesogen, and the alignment aid is electrically neutral or quasi-neutral.

The halogen atoms may be connected to an aromatic cyclic between the photo-polymerizable groups, and the halogen atoms may be disposed to be structurally symmetrical.

The mesogen may be one of naphthalene, biphenyl, and bisphenol A combined with the halogen atoms.

The halogen atoms may include one selected from fluorine, chlorine, bromine, and iodine.

The photo-polymerizable group may include at least one selected from an acryl group and a methacryl group.

The alignment aid may include at least one selected from compounds represented by Formulae 1 to 8.

[Formula 1]

[Formula 2]

[Formula 3]

[Formula 4]

[Formula 5]

[Formula 6]

[Formula 7]

[Formula 8]

The voltage applied between the pixel electrode and the common electrode may be a DC voltage in a range of about 5V to about 20V.

The method may further include light-irradiating the liquid crystal layer in a state in which the voltage between the pixel electrode and the common electrode is off.

The energy for the light-irradiating of the liquid crystal display in the state in which the voltage of the pixel electrode and the common electrode is off may be in the range of about 20 J/cm$^2$ to about 60 J/cm$^2$.

The energy for the light-irradiating of the liquid crystal display in the state in which the voltage of the pixel electrode and the common electrode is applied may be in the range of about 2 J/cm$^2$ to about 10 J/cm$^2$.

At least one of a color filter and a black matrix may be disposed on the thin film transistor array panel, and the light may be irradiated to the liquid crystal layer through the second display panel.

In accordance with another exemplary embodiment of the present invention, a liquid crystal composition is provided. The liquid crystal composition includes liquid crystal molecules and an alignment polymer, wherein the alignment polymer is formed by light-irradiating the liquid crystal molecules and an alignment aid. The alignment aid includes a mesogen having halogen atoms and at least one photo-polymerizable group combined to the mesogen, and wherein the alignment aid is electrically neutral or quasi-neutral.

The halogen atoms may be connected to an aromatic cyclic between the photo-polymerizable groups, and the halogen atoms may be disposed to be structurally symmetrical.

The mesogen may be one of naphthalene, biphenyl, and bisphenol A combined with the halogen atoms.

The halogen atoms may include one selected from fluorine, chlorine, bromine, and iodine.

The alignment aid may include at least one selected from compounds represented by Formulae 1 to 8.

[Formula 1]

[Formula 2]

[Formula 3]

[Formula 4]

[Formula 5]

[Formula 6]

[Formula 7]

[Formula 8]

The alignment aid may be included in an amount of about 0.1 wt % to about 0.5 wt % based on the amount of the liquid crystal molecules.

According to exemplary embodiments of the present invention, the liquid crystal display includes the alignment aid such that the pre-tilt of the liquid crystal molecules may be uniformly controlled, and includes the alignment aid in a specific structure such that the remaining amount of the non-polymerized alignment aid in the liquid crystal layer may be reduced. Accordingly, afterimages due to the non-polymerized alignment aid may be reduced, thereby improving the display characteristics.

BRIEF DESCRIPTION OF THE DRAWINGS

Exemplary embodiments of the present invention can be understood in more detail from the following description taken in conjunction with the attached drawings, in which.

DESCRIPTION OF REFERENCE NUMERALS INDICATING PRIMARY ELEMENTS IN THE DRAWINGS 3 liquid crystal layer
50 alignment aid
100 lower panel
200 upper panel
121 gate line
131, 135 storage electrode line
140 gate insulating layer
154a, 154b semiconductor
163b, 165b ohmic contact
171a, 171b data line
173a, 173b source electrode
175a, 175b drain electrode
180p lower passivation layer
180q upper passivation layer
361, 361a, 361b partition
230 color filter
270 common electrode
310 liquid crystal molecules
363 spacer

DETAILED DESCRIPTION OF THE EXEMPLARY EMBODIMENTS

The present invention will be described more fully hereinafter with reference to the accompanying drawings, in which exemplary embodiments of the invention are shown. However, it is to be understood that the invention is not limited to the disclosed embodiments, but, on the contrary, is intended to cover various modifications. As those skilled in the art would realize, the described embodiments may be modified in various different ways, all without departing from the spirit or scope of the present invention.

In the drawings, the thickness of layers, films, panels, regions, etc., are exaggerated for clarity. It will be understood that when an element such as a layer, film, region, or substrate is referred to as being "on" another element, it can be directly on the other element or intervening elements may also be present. Like reference numerals designate like elements throughout the specification.

Figure 1:
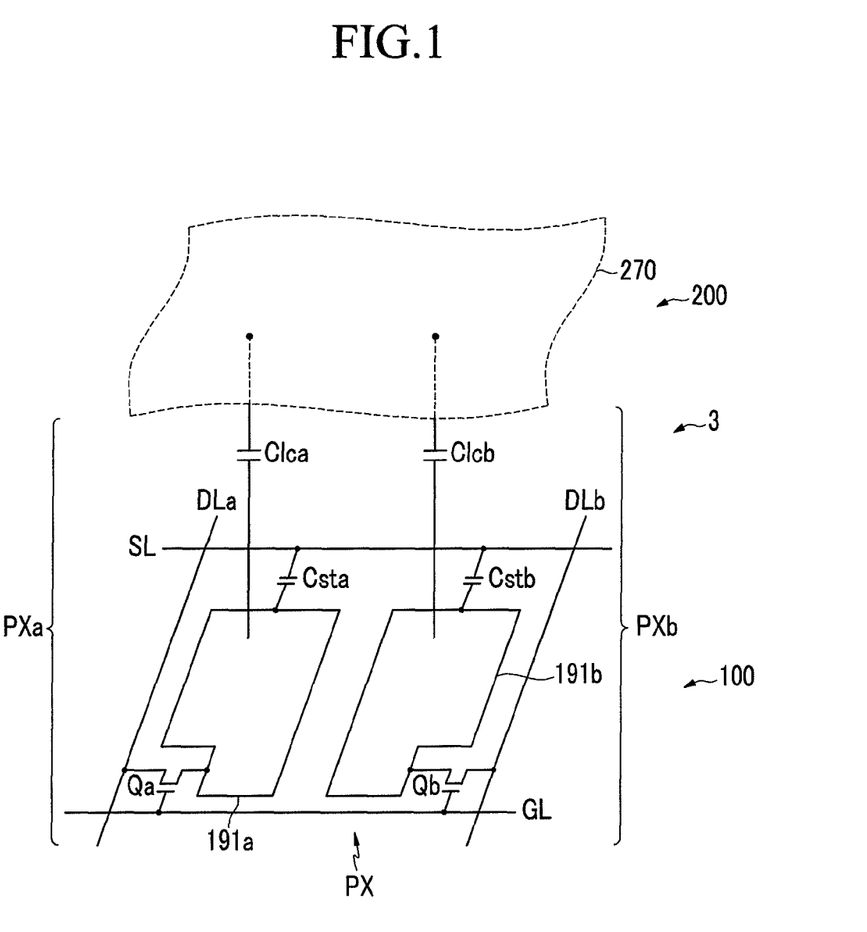
FIG. 1 is an equivalent circuit diagram of one pixel of a liquid crystal display according to an exemplary embodiment of the present invention.

FIG. 1 is an equivalent circuit diagram of one pixel of a liquid crystal display according to an exemplary embodiment of the present invention.

Referring to FIG. 1, a liquid crystal display according to an exemplary embodiment of the present invention includes a thin film transistor array (lower) panel 100 and a common electrode (upper) panel 200 facing each other, and a liquid crystal layer 3 interposed therebetween.

The liquid crystal display according to an exemplary embodiment of the present invention also includes signal lines including a plurality of gate lines GL, a plurality of pairs of data lines DLa and DLb, and a plurality of storage electrode lines SL, and a plurality of pixels PX connected thereto.

The respective pixels PX include a pair of sub-pixels PXa and PXb, and each subpixel PXa/PXb includes a switching element Qa/Qb, a liquid crystal capacitor Clca/Clcb, and a storage capacitor Csta/Cstb.

Each switching element Qa/Qb is a three-terminal element such as, for example, a thin film transistor provided on the lower panel 100, and includes a control terminal connected to the gate line GL, an input terminal connected to the data line DLa/DLb, and an output terminal connected to the liquid crystal capacitor Clca/Clcb and the storage capacitor Csta/Cstb.

The liquid crystal capacitor Clca/Clcb uses a subpixel electrode 191a/191b and a common electrode 270 as two terminals. The liquid crystal layer 3 between the electrodes 191a/191b and 270 functions as a dielectric material.

The storage capacitor Csta/Cstb serving as an assistant to the liquid crystal capacitor Clca/Clcb is formed as a storage electrode line SL provided on the panel 100 and a subpixel electrode 191a/191b overlapped with an insulator interposed therebetween, and a predetermined voltage such as the common voltage Vcom is applied thereto.

The voltages charged at the two liquid crystal capacitors Clca and Clcb are established to slightly differ from each other. For example, the data voltage applied to one of the liquid crystal capacitors Clca is established to be always lower or higher than the data voltage applied to the other liquid crystal capacitor Clcb. When the voltages of the two liquid crystal capacitors Clca and Clcb are properly controlled, an image viewed from the lateral side may maximally approximate an image viewed from the frontal side, thereby improving the lateral visibility of the liquid crystal display.

Figure 2:
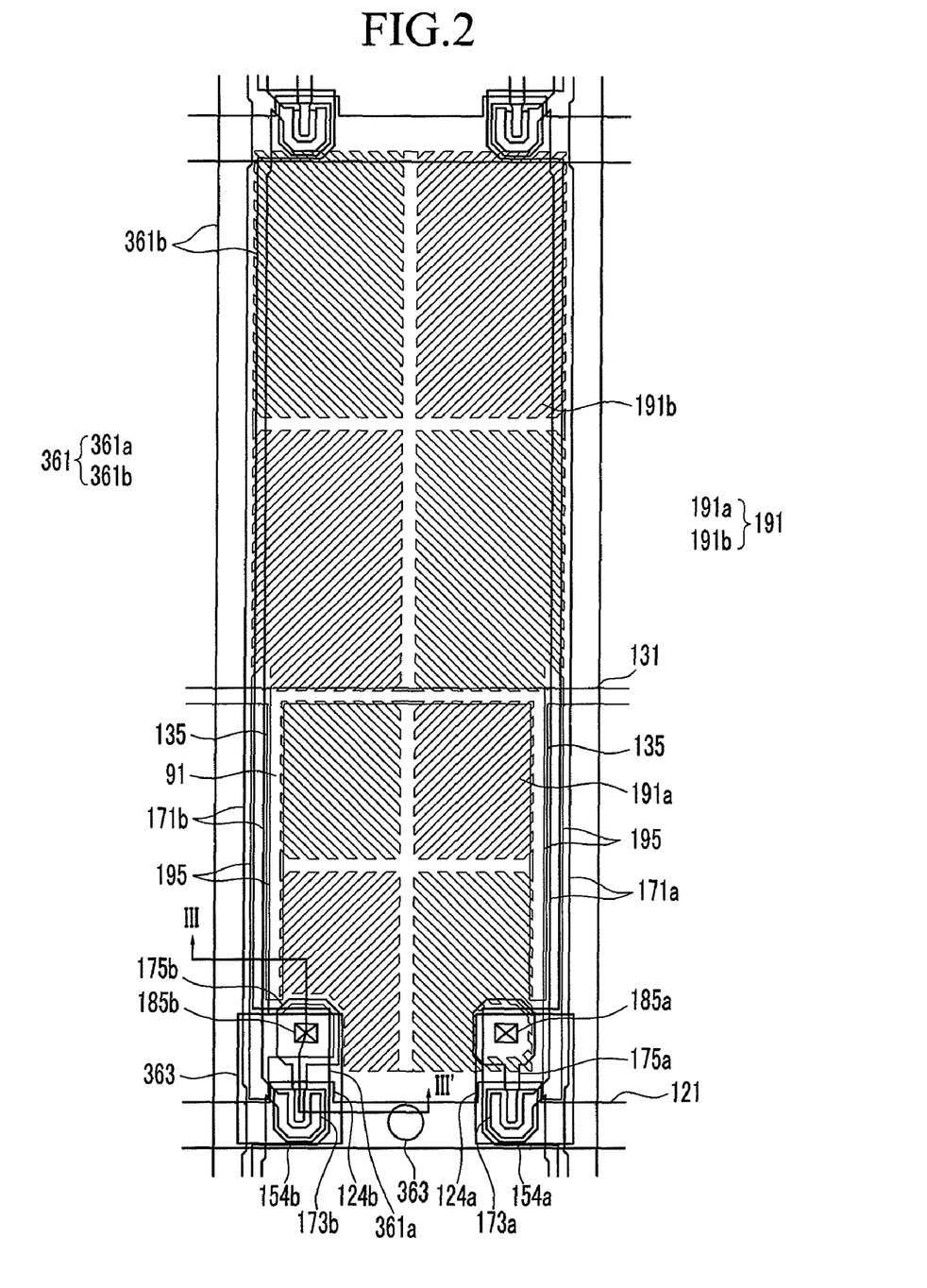
FIG. 2 is a layout view of a liquid crystal display according to an exemplary embodiment of the present invention.
Figure 3:
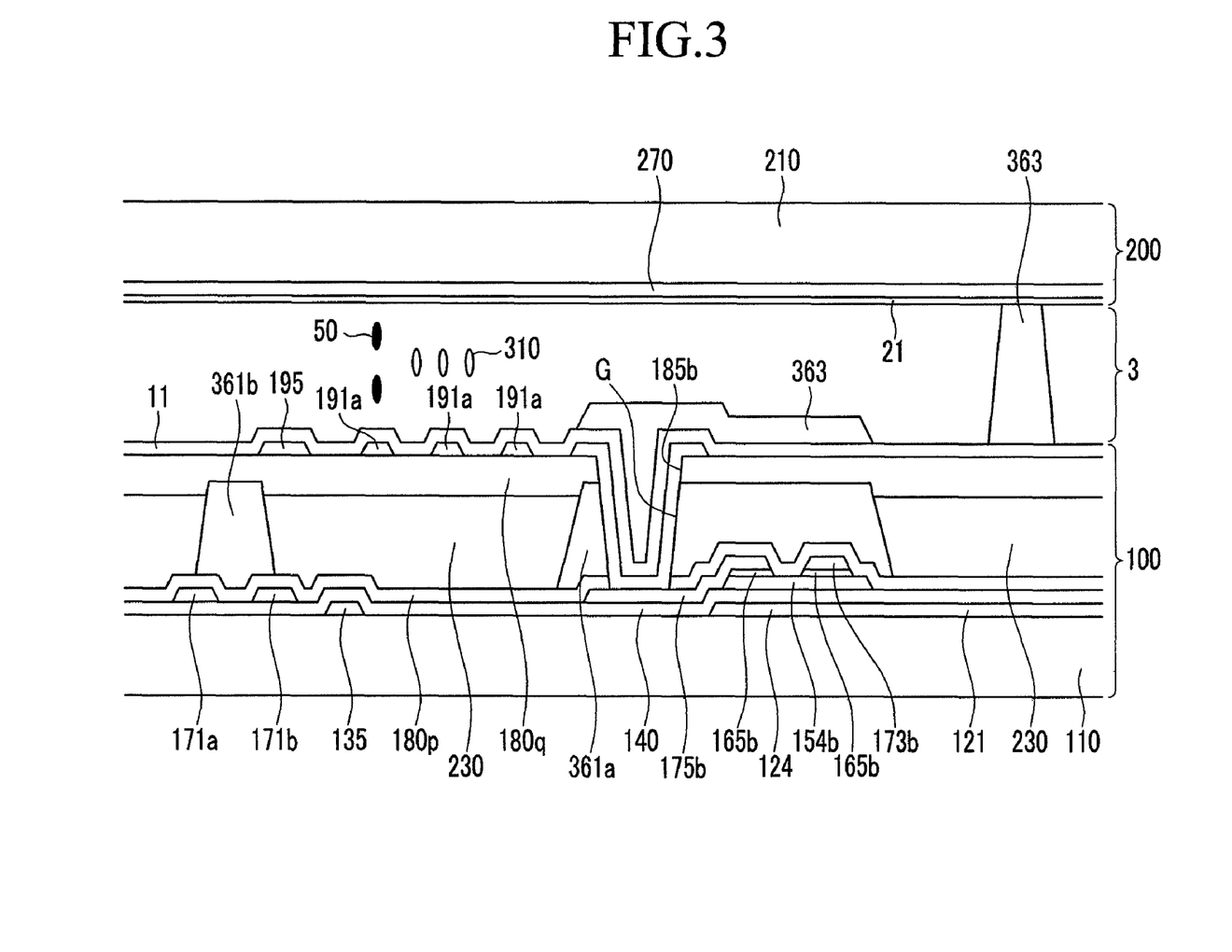
FIG. 3 is a cross-sectional view taken along the line III'-III' of FIG. 2.
Figure 4:
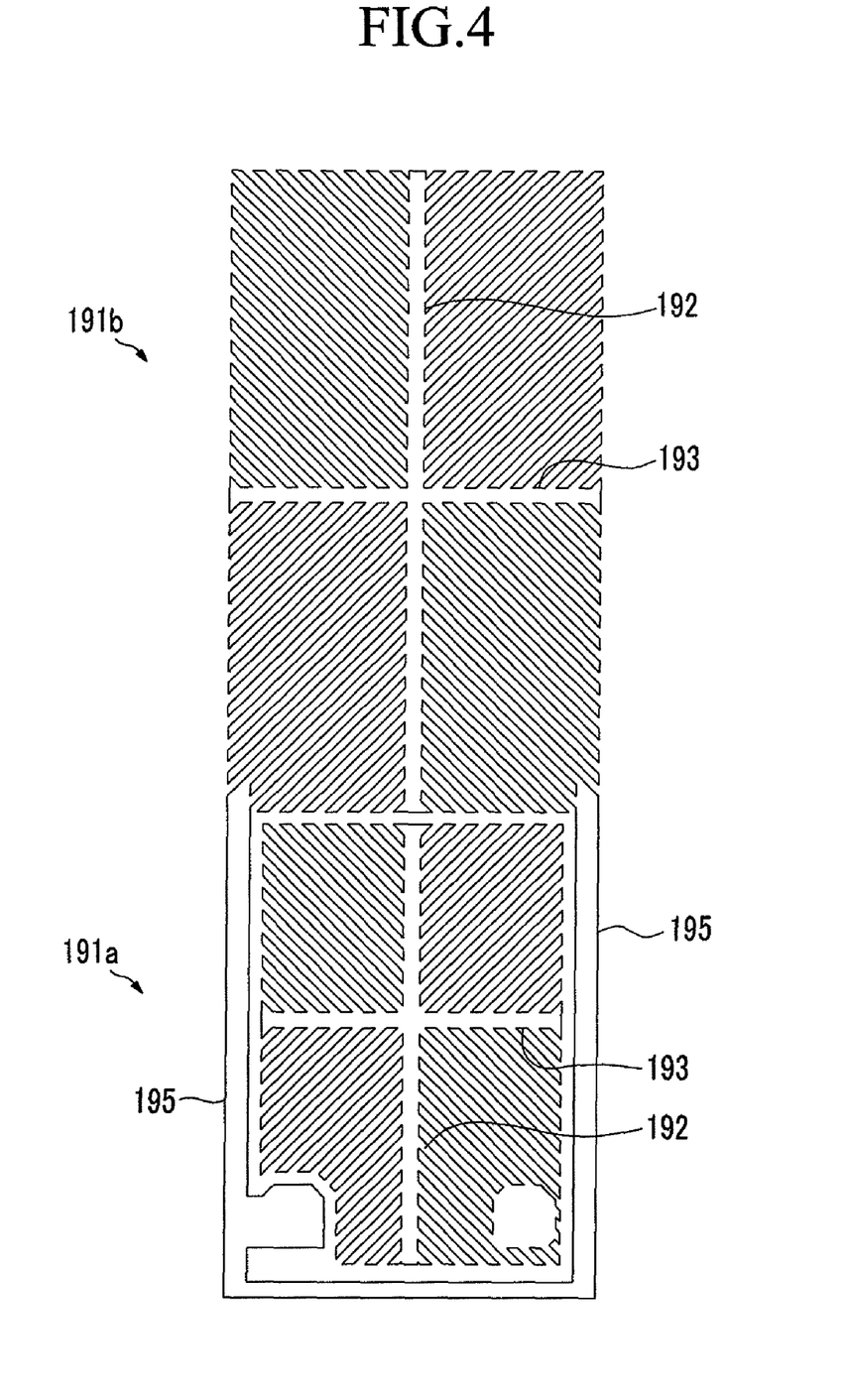
FIG. 4 is a top plan view showing a pixel electrode.
Figure 5:
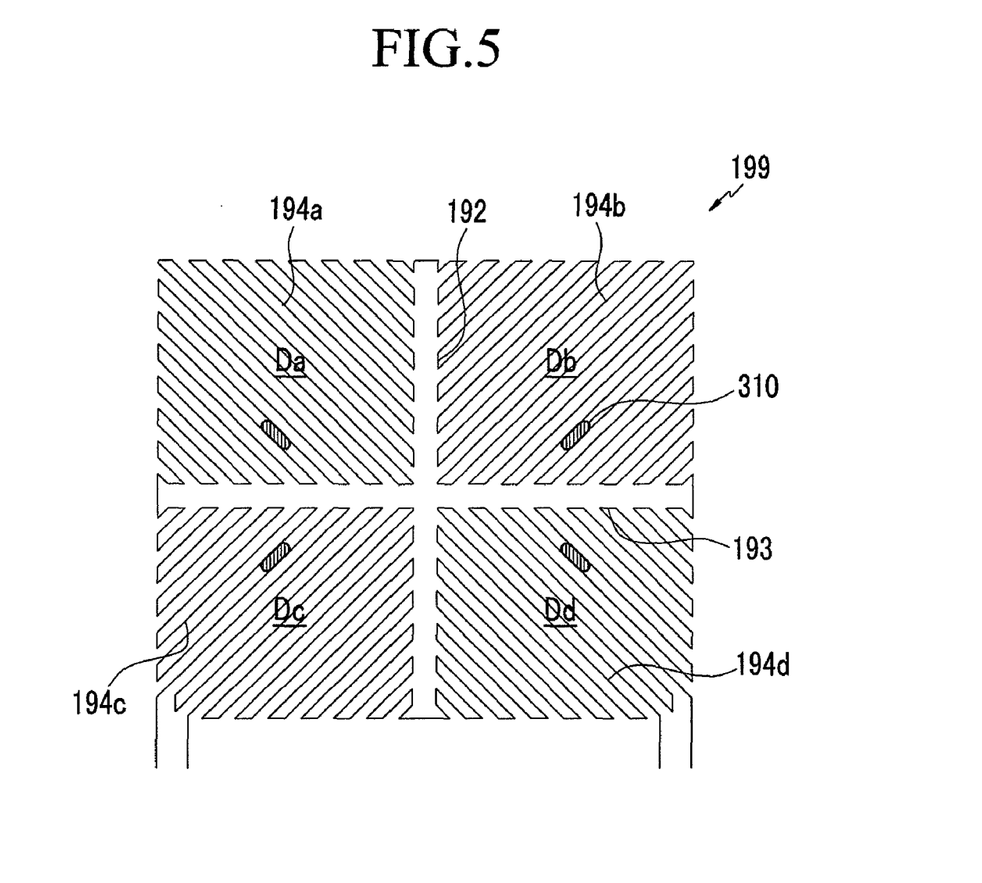
FIG. 5 is a top plan view of a basic electrode in a liquid crystal display according to an exemplary embodiment of the present invention.

FIG. 2 is a layout view of a liquid crystal display according to an exemplary embodiment of the present invention, and FIG. 3 is a cross-sectional view taken along the line of FIG. 2. FIG. 4 is a top plan view showing a pixel electrode. FIG. 5 is a top plan view of a basic electrode in a liquid crystal display according to an exemplary embodiment of the present invention.

Referring to FIG. 2 and FIG. 3, a liquid crystal display according to an exemplary embodiment of the present invention includes the lower and upper display panels 100 and 200 facing each other, and the liquid crystal layer 3 interposed between the two panels 100 and 200.

The lower display panel 100 will be firstly described in detail.

A plurality of gate lines 121 and a plurality of storage electrode lines 131 and 135 are formed on an insulation substrate 110.

The gate lines 121 transmit gate signals and are substantially extended in the transverse direction. Each gate line 121 includes a plurality of first and second gate electrodes 124a and 124b protruding upward.

The storage electrode lines include a stem 131 extending substantially parallel to the gate lines 121 and a plurality of storage electrodes 135 extended from the stem 131.

However, the shapes and arrangements of the storage electrode lines 131 and 135 may be modified in various forms.

A gate insulating layer 140 is formed on the gate lines 121 and the storage electrode lines 131 and 135, and a plurality of semiconductors 154a and 154b preferably made of, for example, amorphous or crystallized silicon are formed on the gate insulating layer 140.

A plurality of pairs of ohmic contacts 163b and 165b are formed on the first semiconductor 154b, and the ohmic contacts 163b and 165b may be formed of a material such as, for example, n+ hydrogenated amorphous silicon in which an n-type impurity is doped with a high concentration of silicide.

A plurality of pairs of data lines 171a and 171b and a plurality of pairs of first and second drain electrodes 175a and 175b are formed on the ohmic contacts 163b and 165b, and on the gate insulating layer 140.

The data lines 171a and 171b transmit data signals, extend substantially in the longitudinal direction, and cross the gate lines 121 and the stems 131 of the storage electrode lines. The data lines 171a/171b include a plurality of first/second source electrodes 173a/173b extending toward the first/second gate electrodes 124a/124b and curved with a "U" shape, and the first/second source electrodes 173a/173b are opposite to the first/second drain electrodes 175a/175b with respect to the first/second gate electrodes 124a/124b.

The first and second drain electrodes 175a and 175b respectively start from one end enclosed by the first and second source electrodes 173a and 173b and are extended upward, and other end thereof may have a wide area for connection to another layer.

However, the shapes and arrangement of the first and second drain electrodes 175a and 175b and the data lines 171a and 171b may be modified in various forms.

The first/second gate electrodes 124a/124b, the first/second source electrodes 173a/173b, and the first/second drain electrodes 175a/175b respectively form the first/second thin film transistors (TFT) Qa/Qb along with the first/second semiconductors 154a/154b, and the channels of the first/second thin film transistors Qa/Qb are respectively formed on the first/second semiconductors 154a/154b between the first/second source electrodes 173a/173b and the first/second drain electrodes 175a/175b.

The ohmic contacts 163a, 163b, 165a, and 165b are interposed only between the underlying semiconductor islands 154a and 154b, and the overlying data lines 171a and 171b and drain electrodes 175a and 175b, and may reduce contact resistance between them. The semiconductors 154a and 154b have a portion that is exposed without being covered by the data lines 171a and 171b and the drain electrodes 175a and 175b, and a portion between the source electrodes 173a and 173b and the drain electrodes 175a and 175b.

A lower passivation layer 180p preferably made of, for example, silicon nitride or silicon oxide is formed on the data lines 171a and 171b, the drain electrodes 175a and 175b, and the exposed portions of the semiconductors 154a and 154b.

A partition 361 is formed on the lower passivation layer 180p. The partition 361 is formed according to the gate lines 121 and the data lines 171a and 171b, and is also disposed on the thin film transistor. A region enclosed by the partition 361 substantially forms a rectangle as a filling region where a color filter 230 is filled.

The partition 361 includes a first partition 361a formed on the thin film transistor, and a second partition 361b formed on the data lines 171a and 171b. For example, the first partition 361a has openings G, through which the first and second drain electrodes 175a and 175b are exposed to the outside. The second partition 361b is disposed between neighboring data lines 171a and 171b such that it is partially overlapped with the data lines 171a and 171b.

An inkjet material for color filters 230 fills the region surrounded by the partition 361. The color filters 230 may be formed through, for example, inkjet printing. An upper passivation layer 180q is formed on the color filters 230. The upper passivation layer 180q is also present on the partition 361 so as to flatten the underlying layer.

The upper passivation layer 180q may be formed with, for example, a photosensitive organic material. In addition to the openings G, a plurality of contact holes 185a and 185b are formed at the upper passivation layer 180q so as to expose the first and second drain electrodes 175a and 175b.

A plurality of pixel electrodes 191 are formed on the upper passivation layer 180q. For example, the pixel electrodes 191 may be formed with a transparent conductive material such as indium tin oxide (ITO) and indium zinc oxide (IZO), or with a reflective material such as aluminum, silver, chromium, and alloys thereof.

The respective pixel electrodes 191 include first and second sub-pixel electrodes 191a and 191b that are separated from each other by interposing a gap 91, and the first and second sub-pixel electrodes 191a and 191b each include one or more basic electrodes like a basic electrode 199 shown in FIG. 5, or variants thereof.

The basic electrode 199 will now be described in detail with reference to FIG. 4 and FIG. 5.

For example, as shown in FIG. 5, the basic electrode 199 may be wholly quadrangular-shaped, and have a cross-shaped stem portion with transverse and longitudinal stems 193 and 192 extending perpendicular to each other. Furthermore, the basic electrode 199 is partitioned into first to fourth sub-regions Da, Db, Dc, and Dd by way of the transverse and longitudinal stems 193 and 192, and the sub-regions Da to Dd have a plurality of first to fourth minute branches 194a, 194b, 194c, and 194d, respectively.

The first minute branches 194a extend from the horizontal stem 193 or the vertical stem 192 toward the top left while being tilted, and the second minute branches 194b extend from the transverse stem 193 or the transverse stem 192 toward the top right in a tilted manner. The third minute branches 194c extend from the horizontal stem 193 or the vertical stem 192 toward the bottom left in a tilted manner, and the fourth minute branches 194d extend from the transverse stem 193 or the longitudinal stem 192 toward the bottom right in a tilted manner.

The first to fourth minute branches 194a to 194d are angled to the gate line 121 or the transverse stem 193 by, for example, about 45 or about 135 degrees. Furthermore, the minute branches 194a to 194d of two neighboring sub-regions Da to Dd may extend perpendicular to each other.

In addition, the widths of the minute branches 194a to 194d may be enlarged when coming closer to the transverse stem 193 or the longitudinal stem 192.

Referring to FIG. 2 to FIG. 5 again, the first and second sub-pixel electrodes 191a and 191b each include one basic electrode 199. However, the area of the second sub-pixel electrode 191b in the whole pixel electrode 191 may be larger than the area of the first sub-pixel electrode 191a, and in this case, the second sub-pixel electrode 191b is differentiated in size of the basic electrode 199 such that the area thereof is larger than the area of the first sub-pixel electrode 191a by, for example about 1.0 to about 2.2 times.

The second sub-pixel electrode 191b includes a pair of branches 195 extending according to the data line 171. The branches 195 are disposed between the first sub-pixel electrode 191a and the data lines 171a and 171b, and are connected to the bottom of the first sub-pixel electrode 191a. The first and second sub-pixel electrodes 191a and 191b are physico-electrically connected to the first and second drain electrodes 175a and 175b through the contact holes 185a and 185b so as to receive data voltages from the first and second drain electrodes 175a and 175b.

The upper display panel 200 will now be described in detail.

With the upper display panel 200, a common electrode 270 is formed on the entire surface of a transparent insulation substrate 210.

Spacers 363 are formed over the gate lines 121 or the thin film transistors so as to space the upper and lower panels 200 and 100 apart from each other by a predetermined distance. The spacer 363 formed over the thin film transistor is overlapped with the first and second source electrodes 173a and 173b and the first and second drain electrodes 175a and 175b, and fills the opening G of the first barrier rib portion 361a and the contact hole 185b of the upper passivation layer 180q from the top side of the pixel electrode 191.

Alignment layers 11 and 21 are respectively coated on the inner surface of the lower panel 100 and the upper panel 200, and they may be vertical alignment layers.

Polarizers may be provided on the outer surfaces of the lower panel 100 and the upper panel 200.

A liquid crystal layer 3 is formed between the lower panel 100 and the upper panel 200. The liquid crystal layer 3 includes a plurality of liquid crystal molecules 310, and an alignment polymer formed by irradiating light to an alignment aid 50.

The liquid crystal molecules 310 have negative dielectric anisotropy, and may be oriented such that the major axes thereof are almost perpendicular to the surfaces of the two display panels 100 and 200 when no electric field is applied.

If voltages are applied to the pixel electrode 191 and the common electrode 270, the liquid crystal molecules 310 may respond to the electric field generated between the pixel electrode 191 and the common electrode 270 such that the long axes thereof tend to be perpendicular to the electric field direction. The change degree of polarization of the light that is incident to the liquid crystal layer 3 may be changed according to the inclination degree of the liquid crystal molecules 310, and this change of polarization appears as a change of transmittance by the polarizer, thereby displaying images of the liquid crystal display.

The inclination direction of the liquid crystal molecules 310 may be determined by the minute branches 194a-194d of the pixel electrodes 191, and the liquid crystal molecules 310 are inclined in the direction parallel to the length direction of the minute branches 194a-194d. In an exemplary embodiment of the present invention, the length directions in which the minute branches 194a-194d are extended in one pixel PX are all four directions such that the inclined directions of the liquid crystal molecules 310 are all four directions. Thereby, four domains having different alignment directions of the liquid crystal molecules 310 are formed in the liquid crystal layer 3. Therefore, the viewing angle of the liquid crystal display may be widened by varying the inclined directions of the liquid crystal molecules.

The alignment polymer formed by the polymerization of the alignment aid 50 has a function of controlling a pre-tilt as an initial alignment direction of the liquid crystal 310. The alignment aid 50 may be, for example, a reactive mesogen.

The alignment aid 50 has a similar shape to the liquid crystal molecules, and includes a core group forming a core axis and a terminal group connected thereto.

The alignment aid 50 according to an exemplary embodiment of the present invention has, for example, the mesogen as the core group and a photo-polymerizable group as the terminal group.

The mesogen includes a structure in which two or more aromatic or aliphatic cyclic compounds are connected to each other on the central thereof. For example, the mesogen may include one selected from a naphthalene group represented by Formula A, a biphenyl group represented by Formula B, a bisphenol A group represented by Formula C, and derivatives including halogen atoms as compounds represented by Formula D.

[Formula A]

[Formula B]

[Formula C]

[Formula D]

Here, for example, the halogen atoms are substitute at the position of a hydrogen atom of the cyclic compound, and the halogen atoms are structurally positioned to be symmetrical and may be electrically neutral. The halogen atoms may include, for example, one selected from fluorine, chlorine, bromine, and iodine.

A photo-polymerizable group is a functional group that is able to be polymerized by light, but is not limited thereto, and for example may include one selected from an acryl group represented by Formula F and a methacryl group represented by Formula G

[Formula G]

Also, the alignment aid 50 may further include, for example, a chain alkyl group having 1 to 30 carbon atoms disposed between the mesogen and the photo-polymerizable group. The chain alkyl group is disposed between the mesogen and the photo-polymerizable group, thereby controlling a chain length such that it may increase the polymerization degree when the alignment aid 50 receives light.

The alignment aid 50 may be one selected from the compounds represented by, for example, Formula 1 to 8.

[Formula 1]
[Formula 2]
[Formula 3]
[Formula 4]
[Formula 5]
[Formula 6]
[Formula 7]
[Formula 8]

In Formula 1 to Formula 8, two aromatic cyclics are connected by a single combination line, and the halogen atoms combined to the aromatic cyclic may be disposed to be structurally symmetrical. For example, the halogen atoms may be disposed to be symmetrical with respect to an axis that is substantially perpendicular to the singular combination line connecting the aromatic cyclics to each other. Also, the alignment aid may have the electrical neutrality.

In Formula 1 and Formula 5, the halogen atoms are disposed close to the axis that is substantially perpendicular to the singular combination line such that the alignment aid is almost electrically neutral. As shown in Formula E, when the halogen atoms are combined on the first portion (a) and the second portion (b) where the carbon of the aromatic cyclic are positioned, or when the halogen atoms are combined on the third portion (a') and the fourth portion (b'), the alignment aid is almost electrically neutral. This corresponds to Formula 1 and Formula 5, and this case is hereafter defined as quasi-neutrality.

[Formula E]

The above described alignment aid 50 may be included in an amount of, for example, about 0.1 wt % to about 10 wt % with respect to the amount of the liquid crystal molecules 310. When the amount is less than about 0.1 wt %, the alignment aid 50 may not execute the function of controlling the pre-tilt of the liquid crystal molecules 310, and when the amount is more than about 10 wt %, the amount of the liquid crystal molecules 310 may be relatively low such that the display characteristics may be deteriorated. For example, the alignment aid 50 may be included in an amount of about 0.1 wt % to about 0.5 wt % with respect to the amount of the liquid crystal molecules 310.

The alignment aid 50 may be polymerized by, for example, light.

This will be described with reference to FIG. 6 as well as FIG. 2 to FIG. 5.

Figure 6:
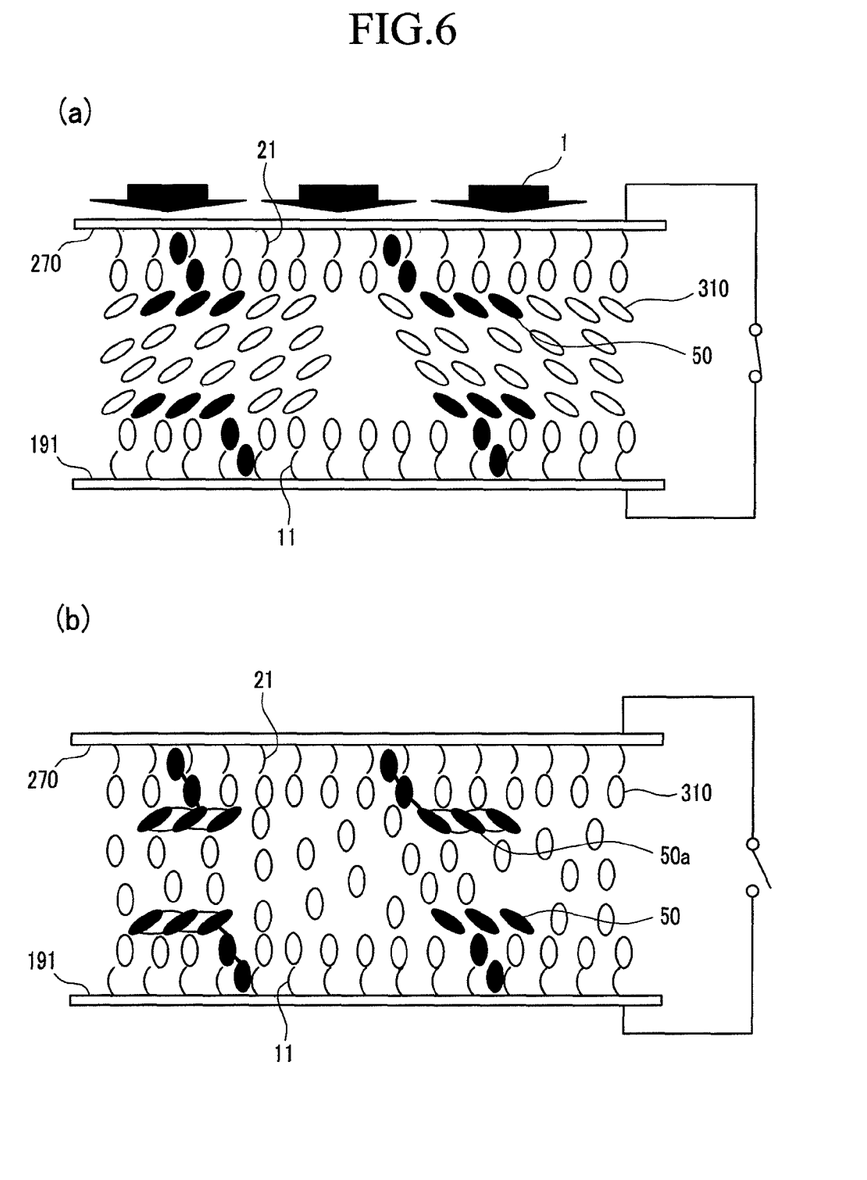
FIG. 6 is a schematic diagram showing a method for forming a pre-tilt of liquid crystal molecules through an alignment aid according to an exemplary embodiment of the present invention.

FIG. 6 is a schematic diagram showing a method for forming a pre-tilt of liquid crystal molecules through an alignment aid according to an exemplary embodiment of the present invention.

Firstly, a thin film transistor array panel 100 and a common electrode panel 200 are respectively manufactured.

The lower panel 100 may be manufactured, for example, by the following method described below.

A plurality of thin films are deposited on a substrate 110, and are patterned to sequentially form a gate line 121 including gate electrodes 124a and 124b, a gate insulating layer 140, semiconductors 154a and 154b, data lines 171a and 171b respectively including source electrodes 173a and 173b, drain electrodes 175a and 175b, and a lower passivation layer 180p.

Next, a partition 361 is formed on the lower passivation layer 180p, a color filter 230 is filled in the region enclosed by the partition 361, and an upper passivation layer 180q is formed on the color filter 230.

A conductive layer such as, for example, ITO or IZO is deposited on the upper passivation layer 180q, and is patterned to form a pixel electrode 191 including a longitudinal stem 192, a transverse stem 193, and a plurality of minute branches 194a, 194b, 194c, and 194d extended therefrom, as shown in FIG. 4 and FIG. 5.

Next, an alignment layer 11 is coated on the pixel electrode 191.

The upper panel 200 may be manufactured, for example, by the following method described below.

A common electrode 270 is formed on a substrate 210. An alignment layer 21 is coated on the common electrode 270.

Next, the lower panel 100 and the upper panel 200 that are manufactured through the above-described method are assembled, and a liquid crystal layer 3 is formed by injecting a mixture of liquid crystal molecules 310 and the above-described alignment aid 50 therebetween. However, the liquid crystal layer 3 may be formed by a method in which the mixture of the liquid crystal molecules 310 and the alignment aid 50 is dripped on the lower panel 100 or the upper panel 200.

Next, referring to FIG. 6 (a) and FIG. 5, voltages are applied to the pixel electrode 191 and the common electrode 270. The liquid crystal molecules 310 and the alignment aid 50 are inclined in a direction parallel to the length direction of the minute branches 194a-194d of the pixel electrode 191 by the application of the voltages. The liquid crystal molecules 310 near the alignment layer 11 maintain vertical alignment by a chain of the alignment layer 11.

First light 1 is irradiated in a state in which the voltages are applied between the pixel electrode 191 and common electrode 270. The first light has a wavelength that can polymerize the alignment aid 50, such as, for example, ultraviolet rays. Accordingly, the alignment aid 50 that is agglomerated is polymerized to form a polymer 50a. The polymer 50a can control the pre-tilt of the liquid crystal molecules 310.

The voltages applied to the pixel electrode 191 and the common electrode are DC voltages, the magnitude thereof may be in the range of, for example, about 5V to about 20V, and the energy of the first light may be in the range of, for example, about 5 J/cm$^2$ to about 10 J/cm$^2$. If the energy is less than about 5 J/cm$^2$, the response speed may be decreased, while if the energy is more than about 10 J/cm$^2$, the response speed may be increased, but the contrast ratio may be decreased.

Next, as shown in FIG. 6 (b), the voltages between the pixel electrode 191 and the common electrode 270 are off.

Next, light is irradiated to the liquid crystal layer 3 in a state in which the voltages between the pixel electrode 191 and the common electrode 270 are off, thereby increasing the polymerization ratio.

The liquid crystal layer 3 includes the polymerized polymer 50a and the non-polymerized alignment aid 50. However, the alignment aid 50 according to an exemplary embodiment of the present invention may increase the polymerization reactivity such that the remaining amount of non-polymerized alignment aid 50 may be reduced. In the liquid crystal display according to an exemplary embodiment of the present invention, the remaining amount of the non-polymerized alignment aid may be less than about 5 wt % of the total amount of the alignment aid.

When the amount of the non-polymerized alignment aid 50 is high, a difference of the pre-tilts may be generated in a black/white display unit when inspecting an afterimage, and the afterimage may be visually recognized from the outside.

The response characteristic and the reaction efficiency of the liquid crystal display according to exemplary embodiments of the present invention will be described through comparative examples.

In Formula [1A] as Comparative Example 1, a biphenyl group that corresponds to the mesogen is electrically neutral such that movement of the mesogen is not limited by the electric field, thereby well-generating the hardening reaction with a neighboring mesogen. Accordingly, the remaining amount of mesogen may be small, thereby reducing the afterimages.

Formula [1A]

Formula [1B] as Comparative Example 2 has a chemical structure of electrical negativity such that the movement of the mesogen may be fixed when applying an electric field perpendicular to the upper and lower panels under the application of the voltage, and thereby a reaction collision probability with the neighboring mesogen may be low, and accordingly the hardening reaction may not be beneficial.

Formula [1B]

Figure 7A:
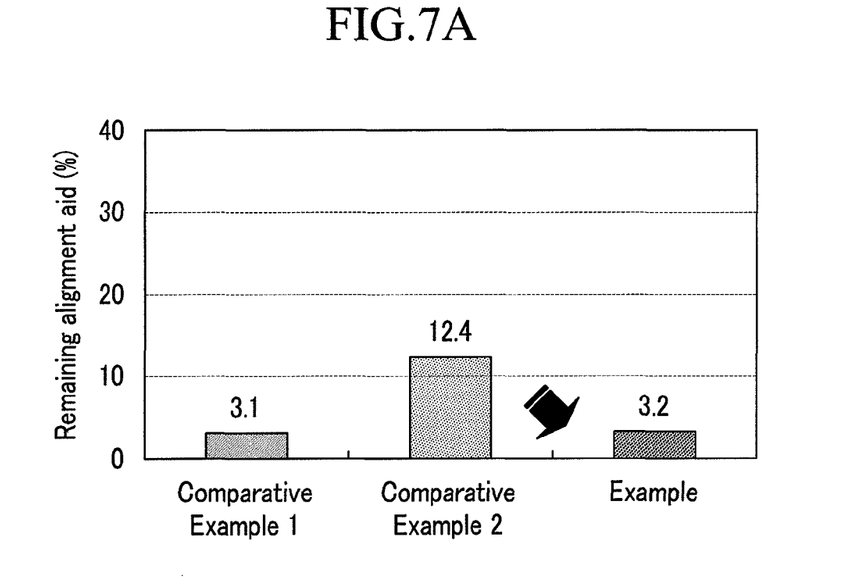
FIG. 7A and FIG. 7B are graphs comparing a remaining mesogen amount and response speed between a liquid crystal display according to an exemplary embodiment of the present invention and a comparative example.
Figure 7B:
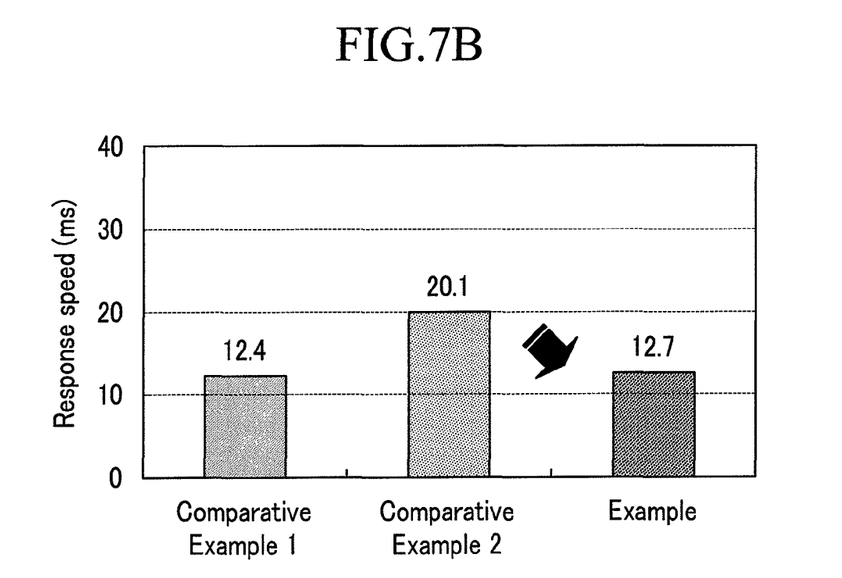

FIG. 7A and FIG. 7B are graphs comparing a remaining mesogen amount and response speed for Formula [1C] as a mesogen of an alignment aid in a liquid crystal display according to an exemplary embodiment of the present invention, and comparative examples of Formula [1A] and the Formula [1B].

Formula [1C]

As shown in the graphs of FIG. 7A and FIG. 7B, the alignment aid includes the halogen atoms in the aromatic cyclic between the photo-polymerizable group in the liquid crystal display according to an exemplary embodiment of the present invention, and the halogen atoms are structurally disposed to be symmetrical, thereby having the electrical neutrality such that the amount of the remaining mesogen may be reduced to a similar degree to that of Comparative Example 1, and the response speed may improve.

As above-described, the liquid crystal display according to an exemplary embodiment of the present invention may include the alignment aid such that the pre-tilt of the liquid crystal molecules may be uniformly controlled, and may include the alignment aid in a specific structure such that the remaining amount of the non-polymerized alignment aid inside the liquid crystal layer may be reduced. Accordingly, afterimages due to the non-polymerized alignment aid may be reduced, thereby improving the display characteristic.

A liquid crystal composition according to another exemplary embodiment of the present invention may include the liquid crystal molecules and the alignment polymer. The alignment polymer has a function of controlling the pre-tilt that is the initial alignment direction of the liquid crystal molecules. The alignment aid has a similar shape to the liquid crystal molecules, and includes the core group forming the core axis and the terminal group connected thereto.

The alignment aid according to an exemplary embodiment of the present invention may have, for example, the mesogen as the core group and the photo-polymerizable group as the terminal group. The alignment polymer is formed by, for example, light-irradiating the liquid crystal molecules and the alignment aid, and the alignment aid includes, for example, the mesogen having the halogen atoms, and the photo-polymerizable group combined to the mesogen. The alignment aid has electrical neutrality or quasi-neutrality. The above description of the alignment aid included in the liquid crystal layer with reference to FIG. 1 to FIG. 8 is applied to the liquid crystal composition according to an exemplary embodiment of the present invention.

Having described the exemplary embodiments of the present invention, it is further noted that it is readily apparent to those of reasonable skill in the art that various modifications may be made without departing from the spirit and scope of the invention which is defined by the metes and bounds of the appended claims.

What is claimed is:

1. A liquid crystal display comprising:
   a first substrate;
   a second substrate facing the first substrate;
   a field generating electrode disposed on at least one of the first substrate and the second substrate; and
   a liquid crystal layer interposed between the first substrate and the second substrate, and comprising liquid crystal molecules and an alignment polymer,
   wherein the alignment polymer is formed by light-irradiating the liquid crystal molecules and an alignment aid,
   the alignment aid comprises a mesogen having halogen atoms and at least one photo-polymerizable group combined to the mesogen,
   and wherein the alignment aid is electrically neutral or quasi-neutral.

2. The liquid crystal display of claim 1, wherein
   the halogen atoms are connected to an aromatic cyclic between the photo-polymerizable groups, and wherein the halogen atoms are disposed to be structurally symmetrical.

3. The liquid crystal display of claim 2, wherein
   the mesogen includes one of naphthalene, biphenyl, and bisphenol A combined with the halogen atoms.

4. The liquid crystal display of claim 3, wherein:
   the halogen atoms comprise one selected from fluorine, chlorine, bromine, and iodine.

5. The liquid crystal display of claim 4, wherein
   the photo-polymerizable group comprises at least one selected from an acryl group and a methacryl group.

6. The liquid crystal display of claim 5, wherein
   the alignment aid comprises at least one selected from compounds represented by Formulae 1 to 8:

7. The liquid crystal display of claim 1, wherein
the alignment aid is included in an amount of about 0.1wt % to about 0.5wt % based on an amount of the liquid crystal molecules.

8. The liquid crystal display of claim 1, wherein
the field generating electrode has a plurality of micro-slits.

9. The liquid crystal display of claim 1, further comprising:
at least one of a color filter and a black matrix disposed on the first substrate, wherein the first substrate is a thin film transistor array panel and the second substrate is a common electrode panel.

10. A method for manufacturing a liquid crystal display comprising:
forming a first display panel including a pixel electrode;
forming a second display panel including a common electrode;
assembling the first display panel and the second display panel;
forming a liquid crystal layer including liquid crystal molecules and an alignment aid between the first display panel and the second display panel;
applying a voltage between the pixel electrode and the common electrode; and
light-irradiating the liquid crystal layer in a state in which the voltage is applied between the pixel electrode and the common electrode to polymerize the alignment aid,
wherein the alignment aid comprises a mesogen having halogen atoms and at least one photo-polymerizable group combined to the mesogen, and
wherein the alignment aid is electrically neutral or quasi-neutral.

11. The method of claim 10, wherein
the halogen atoms are connected to an aromatic cyclic between the photo-polymerizable groups, and wherein the halogen atoms are disposed to be structurally symmetrical.

12. The method of claim 11, wherein
the mesogen includes one of naphthalene, biphenyl, and bisphenol A combined with the halogen atoms.

13. The method of claim 12, wherein
the halogen atoms comprises one selected from fluorine, chlorine, bromine, and iodine.

14. The method of claim 13, wherein
the photo-polymerizable group comprises at least one selected from an acryl group and a methacryl group.

15. The method of claim 14, wherein
the alignment aid includes at least one selected from compounds represented by Formulae 1 to 8:

[Formula 1]

[Formula 2]

[Formula 3]

[Formula 4]

[Formula 5]

[Formula 6]

[Formula 7]

[Formula 8]

16. The method of claim 10, wherein
the voltage applied between the pixel electrode and the common electrode is a DC voltage applied in a range of about 5V to about 20V.

17. The method of claim 10, further comprising
light-irradiating the liquid crystal layer in a state in which the voltage between the pixel electrode and the common electrode is off.

18. The method of claim 10, wherein
an energy for the light-irradiating of the liquid crystal display in the state in which the voltage is applied between the pixel electrode and the common electrode is in a range of about 5 J/cm$^2$ to about 10 J/cm$^2$.

19. The method of claim 10, further comprising
at least one of a color filter and a black matrix disposed on the first display panel, and the light is irradiated to the liquid crystal layer through the second display panel, and wherein the first display panel is a thin film transistor array panel.

20. A liquid crystal composition comprising
liquid crystal molecules; and
an alignment polymer,
wherein the alignment polymer is formed by light-irradiating the liquid crystal molecules and an alignment aid, and
wherein the alignment aid comprises a mesogen having halogen atoms and at least one photo-polymerizable group combined to the mesogen, and wherein the alignment aid is electrically neutral or quasi-neutral.

21. The method liquid crystal composition of claim 20, wherein
the halogen atoms are connected to an aromatic cyclic between the photo-polymerizable groups and wherein the halogen atoms are disposed to be structurally symmetrical.

22. The liquid crystal composition of claim 21, wherein
the mesogen includes one of naphthalene, biphenyl, and bisphenol A combined with the halogen atoms.

23. The liquid crystal composition of claim 22, wherein
the halogen atoms comprises one selected from fluorine, chlorine, bromine, and iodine.

24. The liquid crystal composition of claim 23, wherein
the alignment aid comprises at least one selected from compounds represented by Formulae 1 to 8:

[Formula 1]

[Formula 2]

[Formula 3]

[Formula 4]

[Formula 5]

[Formula 6]

[Formula 7]

[Formula 8]

25. The liquid crystal composition of claim 20, wherein
the alignment aid is included in an amount of about 0.1wt % to about 0.5wt % based on an amount of the liquid crystal molecules.

* * * * *